US009582701B2

(12) United States Patent
Yoshida

(10) Patent No.: US 9,582,701 B2
(45) Date of Patent: Feb. 28, 2017

(54) INFORMATION INPUT/OUTPUT METHOD USING DOT PATTERN

(71) Applicant: Kenji Yoshida, Tokyo (JP)

(72) Inventor: Kenji Yoshida, Tokyo (JP)

( * ) Notice: Subject to any disclaimer, the term of this patent is extended or adjusted under 35 U.S.C. 154(b) by 0 days.

(21) Appl. No.: 14/047,759

(22) Filed: Oct. 7, 2013

(65) Prior Publication Data

US 2014/0029062 A1    Jan. 30, 2014

Related U.S. Application Data

(60) Continuation of application No. 13/589,767, filed on Aug. 20, 2012, now Pat. No. 8,553,284, which is a division of application No. 13/251,903, filed on Oct. 3, 2011, now Pat. No. 8,253,982, which is a division of application No. 11/912,597, filed as application No. PCT/JP2005/008210 on Apr. 28, 2005, now Pat. No. 8,031,375.

(51) Int. Cl.
| | |
|---|---|
| *H04N 1/40* | (2006.01) |
| *G06K 15/10* | (2006.01) |
| *G06K 9/66* | (2006.01) |
| *G06K 7/14* | (2006.01) |
| *G06K 19/06* | (2006.01) |

(52) U.S. Cl.
CPC ..... *G06K 7/1417* (2013.01); *G06K 19/06037* (2013.01); *G06K 2019/06234* (2013.01)

(58) Field of Classification Search
USPC .................................. 358/3.28, 1.8; 382/190
See application file for complete search history.

(56) References Cited

U.S. PATENT DOCUMENTS

| | | |
|---|---|---|
| 4,263,504 A | 4/1981 | Thomas |
| 4,604,065 A | 8/1986 | Frazer et al. |
| 4,627,819 A | 12/1986 | Burrows |
| 5,051,736 A | 9/1991 | Bennett et al. |

(Continued)

FOREIGN PATENT DOCUMENTS

| | | |
|---|---|---|
| CA | 2 374 716 A1 | 11/2000 |
| CA | 2 374 808 A1 | 12/2000 |

(Continued)

OTHER PUBLICATIONS

Russian Office Action dated Apr. 28, 2005, Issued in corresponding Russian Patent Application No. 2007-144103.

(Continued)

*Primary Examiner* — Charlotte M Baker
(74) *Attorney, Agent, or Firm* — Westerman, Hattori, Daniels & Adrian, LLP

(57) ABSTRACT

A dot pattern including a block defined as a rectangular area of a square or a rectangle of a medium face, such as printed matter. A straight line in a vertical direction and a horizontal direction configuring a frame of the block each are defined as a standard grid line. Virtual reference grid points are provided at predetermined intervals on the reference grid line. Reference grid point dots are placed on respective virtual reference grid points. Straight lines that connect the virtual reference grid points to each other and are parallel to the reference grid lines are defined as grid lines. A point of intersection of grid lines is defined as a virtual grid point. A dot pattern is generated by arranging one or a plurality of information dots, each of which has a distance and a direction around the virtual grid point.

31 Claims, 13 Drawing Sheets

(56) References Cited

U.S. PATENT DOCUMENTS

| | | | |
|---|---|---|---|
| 5,124,536 | A | 6/1992 | Priddy et al. |
| 5,128,528 | A | 7/1992 | Heninger |
| 5,329,107 | A | 7/1994 | Priddy et al. |
| 5,329,108 | A | 7/1994 | Lamoure |
| 5,416,312 | A | 5/1995 | Lamoure |
| 5,577,774 | A | 11/1996 | Morikawa et al. |
| 5,591,957 | A | 1/1997 | Morikawa et al. |
| 5,612,524 | A | 3/1997 | Sant'Anselmo et al. |
| 5,661,506 | A | 8/1997 | Lazzouni et al. |
| 5,852,434 | A | 12/1998 | Sekendur |
| 5,860,679 | A | 1/1999 | Fukuda et al. |
| 5,866,895 | A | 2/1999 | Fukuda et al. |
| 5,874,718 | A | 2/1999 | Matsui |
| 5,878,023 | A | 3/1999 | Matsui |
| 5,892,846 | A | 4/1999 | Davis |
| 5,896,403 | A | 4/1999 | Nagasaki et al. |
| 5,920,661 | A | 7/1999 | Mori et al. |
| 6,012,961 | A | 1/2000 | Sharpe, III et al. |
| 6,043,899 | A | 3/2000 | Morohashi et al. |
| 6,050,731 | A | 4/2000 | Matsui |
| 6,052,813 | A | 4/2000 | Nagasaki et al. |
| 6,058,498 | A | 5/2000 | Nagasaki et al. |
| 6,072,917 | A | 6/2000 | Mori et al. |
| 6,116,510 | A | 9/2000 | Nishino |
| 6,119,937 | A | 9/2000 | Wang et al. |
| 6,133,927 | A | 10/2000 | Arai et al. |
| 6,186,405 | B1 | 2/2001 | Yoshioka |
| 6,244,764 | B1 | 6/2001 | Lei et al. |
| 6,360,948 | B1 | 3/2002 | Yang et al. |
| 6,438,251 | B1 | 8/2002 | Yamaguchi |
| 6,446,866 | B1 | 9/2002 | Tatsuta |
| 6,460,155 | B1 | 10/2002 | Nagasaki et al. |
| 6,502,756 | B1 | 1/2003 | Fahraeus |
| 6,533,182 | B1 | 3/2003 | Ohshima et al. |
| 6,548,768 | B1 | 4/2003 | Pettersson et al. |
| 6,561,423 | B2 | 5/2003 | Yoshioka |
| 6,570,104 | B1 | 5/2003 | Ericson et al. |
| 6,586,688 | B2 | 7/2003 | Wiebe |
| 6,627,870 | B1 | 9/2003 | Lapstun et al. |
| 6,633,008 | B2 | 10/2003 | Johnson |
| 6,633,526 | B1 | 10/2003 | Imade et al. |
| 6,663,008 | B1 | 12/2003 | Pettersson et al. |
| 6,666,376 | B1 | 12/2003 | Ericson |
| 6,674,427 | B1 | 1/2004 | Pettersson et al. |
| 6,732,927 | B2 | 5/2004 | Olsson et al. |
| 6,964,373 | B2 | 11/2005 | Sasaki et al. |
| 7,328,845 | B2 | 2/2008 | Tsai |
| 7,475,824 | B2 | 1/2009 | Yoshida |
| 7,664,312 | B2 | 2/2010 | Yoshida |
| 7,942,341 | B2 | 5/2011 | Ao et al. |
| 7,967,217 | B2 | 6/2011 | Yoshida |
| 8,031,375 | B2 | 10/2011 | Yoshida |
| 8,237,983 | B2 | 8/2012 | Yoshida |
| 8,253,982 | B2 | 8/2012 | Yoshida |
| 8,430,328 | B2 | 4/2013 | Yoshida |
| 8,553,284 | B2 | 10/2013 | Yoshida |
| 2002/0030104 | A1 | 3/2002 | Matsui et al. |
| 2002/0033820 | A1 | 3/2002 | Wiebe |
| 2002/0044138 | A1 | 4/2002 | Edso et al. |
| 2002/0159089 | A1 | 10/2002 | Wiebe et al. |
| 2003/0012455 | A1 | 1/2003 | Olsson et al. |
| 2005/0052682 | A1 | 3/2005 | Ishikawa et al. |
| 2005/0173533 | A1 | 8/2005 | Pettersson |
| 2005/0173544 | A1 | 8/2005 | Yoshida |
| 2006/0154559 | A1 | 7/2006 | Yoshida |
| 2007/0023523 | A1 | 2/2007 | Onishi |
| 2007/0164110 | A1 | 7/2007 | Yoshida |
| 2008/0149714 | A1 | 6/2008 | Cheung et al. |
| 2008/0149722 | A1 | 6/2008 | Cheung et al. |
| 2008/0252916 | A1 | 10/2008 | Huang |
| 2012/0325910 | A1 | 12/2012 | Yoshida |
| 2013/0050724 | A1 | 2/2013 | Yoshida |
| 2013/0334322 | A1 | 12/2013 | Yoshida |
| 2014/0029062 | A1 | 1/2014 | Yoshida |

FOREIGN PATENT DOCUMENTS

| | | | |
|---|---|---|---|
| CA | 2 519 271 | A1 | 9/2004 |
| EP | 0 407 734 | A1 | 1/1991 |
| EP | 0 670 555 | A1 | 9/1995 |
| EP | 1 159 991 | A2 | 12/2001 |
| EP | 1 229 471 | A1 | 8/2002 |
| EP | 1 548 635 | A1 | 6/2005 |
| EP | 1 605 395 | A1 | 12/2005 |
| EP | 1 703 434 | A1 | 9/2006 |
| EP | 1833001 | A1 | 9/2007 |
| EP | 1876555 | A1 | 1/2008 |
| GB | 2 349 836 | A | 11/2000 |
| JP | 61-065213 | A | 4/1986 |
| JP | 7-141104 | A | 6/1995 |
| JP | 7-178257 | A | 7/1995 |
| JP | 7-296387 | A | 11/1995 |
| JP | 9-185488 | A | 7/1997 |
| JP | 10-187907 | A | 7/1998 |
| JP | 10-257309 | A | 9/1998 |
| JP | 8-171620 | A | 7/1999 |
| JP | 2000-285225 | A | 10/2000 |
| JP | 2000-325668 | A | 11/2000 |
| JP | 2001-318926 | A | 11/2001 |
| JP | 2001-346032 | A | 12/2001 |
| JP | 2002-002024 | A | 1/2002 |
| JP | 2002-41199 | A | 2/2002 |
| JP | 2002-149331 | A | 5/2002 |
| JP | 2002-205291 | A | 7/2002 |
| JP | 2003-511761 | A | 3/2003 |
| JP | 2002-380503 | | 4/2004 |
| JP | 2002-380932 | | 4/2004 |
| JP | 2002-381743 | | 4/2004 |
| JP | 2005-031932 | A | 2/2005 |
| RU | 2126598 | C1 | 2/1999 |
| RU | 2 166 207 | C2 | 4/2001 |
| WO | 95/14346 | A1 | 5/1995 |
| WO | 99/50787 | A1 | 10/1999 |
| WO | 00/72124 | A1 | 11/2000 |
| WO | 00/73981 | A1 | 12/2000 |
| WO | 01/26032 | A1 | 4/2001 |
| WO | 01/48591 | A1 | 7/2001 |
| WO | 01/61455 | A1 | 8/2001 |
| WO | 02/23464 | A1 | 3/2002 |
| WO | 03/049023 | A1 | 6/2003 |
| WO | 2004/029871 | A1 | 4/2004 |
| WO | 2004/084125 | A1 | 9/2004 |
| WO | 2005/064523 | A1 | 7/2005 |

OTHER PUBLICATIONS

European Search Report dated Jun. 18, 2010, issued in corresponding European Patent Application No. 05737287.2.
International Search Report of PCT/JP2005/008210, date of mailing Aug. 16, 2005.
U.S. Non-Final Office Action dated Jun. 20, 2013, issued in related U.S. Appl. No. 13/566,637.
Russian Office Action dated Jan. 19, 2009, issued in corresponding Russian Patent Application No. 2007128915/09(031489). (Cited in related U.S. Appl. No. 11/794,174 (now U.S. Patent No. 8,237,983).
Russian Office Action dated Nov. 17, 2008 (mailing date), issued in corresponding Russian Patent Application No. 2007128915/09(031489).(Cited in related U.S. Appl. No. 11/794,174 (now U.S. Patent No. 8,237,983).
International Preliminary Report on Patentability dated Oct. 30, 2007, issued in corresponding PCT Application No. PCT/JP2005/008210 (Form PCT/IB/373 and Form PCT/ISA/237). Cited in related U.S. Appl. No. 11/794,174 (now U.S. Patent No. 8,237,983.
International Search Report of PCT/JP2004/019613, date of mailing Apr. 12, 2005.
International Preliminary Report dated Jul. 3, 2007, issued in corresponding PCT Application No. PCT/JP2004/019613 (Form PCT/IB/373 and Form PCT/ISA/237).
U.S. Notice of Allowance dated Apr. 4, 2012, issued in related U.S. Appl. No. 11/794,174 (now U.S. Patent No. 8,237,983) (14 pages).

(56) References Cited

OTHER PUBLICATIONS

U.S. Non-Final Office Action dated Jul. 12, 2011, issued in copending related U.S. Appl. No. 11/794,174 (now U.S. Patent No. 8,237,983).
Extended European Search Report dated Aug. 14, 2013, issued in corresponding European Patent Application No. 12173995.7.
European Notice of Opposition to a European Patent dated Aug. 13, 2013, issued in corresponding European Patent Application No. 05737287.2.
German Cancellation Action dated Apr. 30, 2012, issued in German Patent Application DE 202005022002.7, w/ English-language explanation of relevance.
U.S. Notice of Allowance dated Nov. 28, 2011, issued in related U.S. Appl. No. 11/794,174 (now U.S. Patent No. 8,237,983) (9 pages).
U.S. Non-Final Office Action dated Jan. 13, 2012, issued in copending related U.S. Appl. No. 13/251,903.
U.S. Notice of Allowance dated Apr. 25, 2012, issued in related U.S. Appl. No. 13/251,903.
U.S. Final Office Action dated Jan. 2, 2015, issued in U.S. Appl. No. 13/566,637 (52 pages).
U.S. Office Action dated Mar. 6, 2014, issued in U.S. Appl. No. 13/566,637 (44 pages).
European Search Report dated Feb. 17, 2006 issued in corresponding European Patent Application No. 03798532.2, (4 pages).
European Search Report dated Apr. 25, 2006 issued in corresponding European Patent Application No. 03798532.2, (5 pages).
European Search Report dated Aug. 5, 2008 issued in corresponding European Patent Application No. 08008386.8, (8 pages).
Russian Office Action dated Feb. 19, 2008, issued in corresponding Russian Patent Application No. 2005112458/09(014383) (26 pages).
Decision on Grant, issued in corresponding Russian Patent Application No. 2005112458/09(014383) having a filed date of Sep. 26, 2003 (37 pages).
International Search Report, mailing date of Oct. 19, 2006, issued in PCT/SG2006/000185, (3 pages).
"Data Matrix" article in Wikipedia captured Nov. 24, 2014 at http://en.wikipedia.org/wiki/Data_Matrix, (13 pages).
Text (without images) of Pettersson (WO 2003049023 A1) published Jun 12, 2003 and retrieved at http://www.google.com/patents/WO2003049023A1 (9 pages).
U.S. Non-Final Office Action dated Feb. 14, 2012, issued in U.S. Appl. No. 11/993,527 (5 pages).
U.S. Non-Final Office Action dated Apr. 9, 2014, issued in U.S. Appl. No. 13/872,555 (8 pages).
U.S. Non-Final Office Action dated May 5, 2014, issued in U.S. Appl. No. 13/155,785 (7 pages).
U.S. Non-Final Office Action dated Nov. 12, 2009, issued in U.S. Appl. No. 10/529,440 (8 pages).
U.S. Non-Final Office Action dated Nov. 26, 2014, issued in U.S. Appl. No. 13/155,785 (10 pages).
U.S. Final Office Action dated Jun. 24, 2010, issued in U.S. Appl. No. 101529,440 (16 pages).
U.S. Final Office Action dated Jul. 23, 2012, issued in U.S. Appl. No. 11/993,527 (11 pages).
U.S. Notice of Allowance dated Jan. 3, 2013, issued in U.S. Appl. No. 11/993,527 (8 pages).
U.S. Office Action dated Jan. 14, 2015 issued in U.S. Appl. No. 13/872,555 (5 pages).
U.S. Notice of Allowance dated May 7, 2015, issued in U.S. Appl. No. 13/872,555 (5 pages).
U.S. Notice of Allowance dated Feb. 23, 2011, issued in U.S. Appl. No. 10/529,440 (8 pages).
U.S. Notice of Allowance dated Apr. 16, 2015, issued in U.S. Appl. No. 13/155,785 (9 pages).
Communication of Notice of Opposition dated Jun. 24, 2015, issued in EP application No. 06748126.7, (78 pages).
U.S. Non-Final Office Action dated Sep. 11, 2015, issued in U.S. Appl. No. 13/566,637 (55 pages).
U.S. Non-Final Office Action dated Aug. 10, 2015, issued in U.S. Appl. No. 14/546,705 (14 pages).
U.S. Notice of Allowance dated Sep. 3, 2015, issued in U.S. Appl. No. 13/155,785 (24 pages).
U.S. Notice of Allowance dated Aug. 24, 2015, issued in U.S. Appl. No. 13/872,555 (28 pages).
U.S. Non-Final Office Action dated Jul. 29, 2016, issued in U.S. Appl. No. 13/566,637 (75 pages).

Fig. 8

| | | | | | | | | | | | | | | | | | |
|---|---|---|---|---|---|---|---|---|---|---|---|---|---|---|---|---|---|
| $K_1$ 100 | $K_2$ 110 | $K_3$ 000 | $K_4$ 100 | $K_5$ 100 | $K_6$ 000 | $K_7$ 010 | $K_8$ 000 | $K_9$ 000 | $K_{10}$ 100 | $K_{11}$ 000 | $K_{12}$ 100 | $K_{13}$ 100 | $K_{14}$ 110 | $K_{15}$ 000 | $K_{16}$ 110 | $K_{17}$ 010 | $K_{18}$ 100 |
| $R_1$ 001 | $R_2$ 011 | $R_3$ 111 | $R_4$ 101 | $R_5$ 100 | $R_6$ 110 | $R_7$ 000 | $R_8$ 011 | $R_9$ 111 | $R_{10}$ 011 | $R_{11}$ 001 | $R_{12}$ 010 | $R_{13}$ 100 | $R_{14}$ 110 | $R_{15}$ 101 | $R_{16}$ 001 | $R_{17}$ 001 | $R_{18}$ 101 |
| $I_1$ 101 | $I_2$ 001 | $I_3$ 111 | $I_4$ 001 | $I_5$ 000 | $I_6$ 110 | $I_7$ 010 | $I_8$ 011 | $I_9$ 111 | $I_{10}$ 111 | $I_{11}$ 001 | $I_{12}$ 110 | $I_{13}$ 000 | $I_{14}$ 100 | $I_{15}$ 101 | $I_{16}$ 111 | $I_{17}$ 011 | $I_{18}$ 001 |

| | | | | | | |
|---|---|---|---|---|---|---|
| $K_{19}$ 100 | $K_{20}$ 010 | $K_{21}$ 010 | $K_{22}$ 010 | $K_{23}$ 110 | $K_{24}$ 100 | $K_{25}$ 100 |
| $R_{19}$ 110 | $R_{20}$ 100 | $R_{21}$ 010 | $R_{22}$ 001 | $R_{23}$ 011 | $R_{24}$ 111 | $R_{25}$ 011 |
| $I_{19}$ 010 | $I_{20}$ 110 | $I_{21}$ 100 | $I_{22}$ 011 | $I_{23}$ 001 | $I_{24}$ 011 | $I_{25}$ 111 |

※ The most significant two bits of Kn (n=1 to 25) is the true value.
In (n=1 to 25) consists of of Security Table Rn(n=1 to 25) and Kn.
The least significant one bit of Rn corresponds to that of the In.

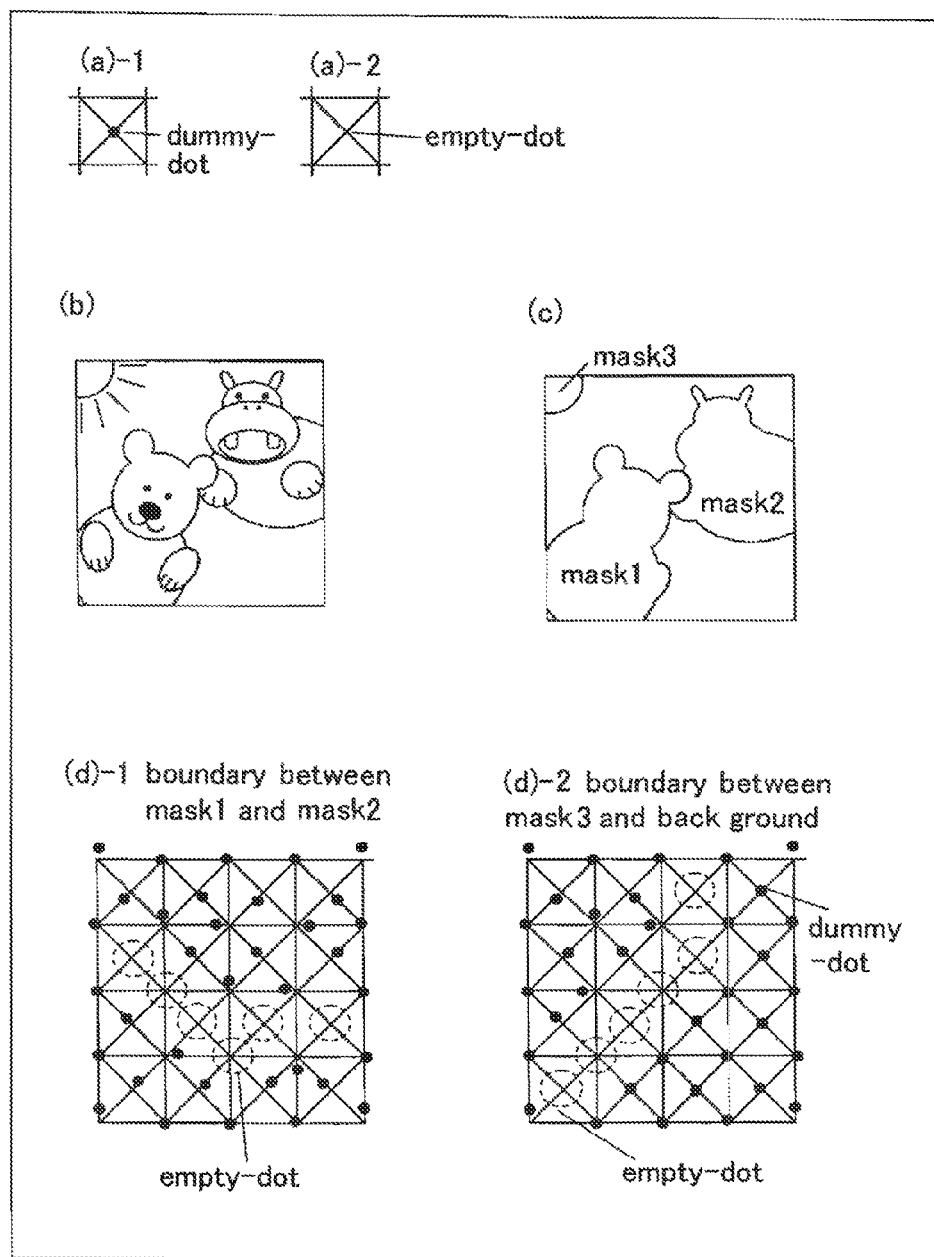

INFORMATION INPUT/OUTPUT METHOD USING DOT PATTERN

CROSS-REFERENCE TO RELATED APPLICATIONS

This application is a continuation application claiming the benefit under 35 U.S.C. §120 of U.S. Pat. No. 8,553,284, to be issued on Oct. 8, 2013 (U.S. patent application Ser. No. 13/589,767, filed Aug. 20, 2012) which is a divisional application claiming benefit under 35 U.S.C. §120 of U.S. Pat. No. 8,253,982, issued on Aug. 28, 2012, (U.S. application Ser. No. 13/251,903, filed on Oct. 3, 2011), which is a divisional application claiming benefit under 35 U.S.C. §120 of U.S. Pat. No. 8,031,375, issued on Oct. 4, 2011 (U.S. application Ser. No. 11/912,597, filed on Oct. 25, 2007), which is a §371 of PCT/JP2005/008210, the entire contents of which are incorporated herein by reference.

TECHNICAL FIELD

The present invention relates to an information input/output method using dot patterns for inputting/outputting a variety of information or programs by optically reading dot pattern information that is formed on a printed matter or the like.

BACKGROUND ART

Conventionally, there has been an information output method for reading a barcode printed on a printed matter or the like, and then, outputting information such as a voice. For example, there has been a method for storing in advance information that is coincident with key information imparted to storage means, retrieving the information from a key read by means of a barcode reader, and then, outputting information or the like. In addition, there has also been proposed a technique of generating a dot pattern obtained by arranging fine dots under a predetermined rule so as to output a plenty of information or programs, picking up and digitizing the dot pattern printed on picking up the dot pattern printed onto a printed matter or the like as image data by means of a camera, digitizing, and then, outputting voice information.

However, the conventional method for outputting a voice or the like by mean of a barcode has entailed a problem that the barcode printed on a printed matter or the like is an eyesore. In addition, the above conventional method has entailed a problem that a barcode is large in size and occupies part of paper, and thus, if the barcode is thus large in size, it is impossible, on the aspect of layout, to clearly lay out a number of barcodes by partial paragraph or sentence or by character or object which has the significance appearing in images of photographs, pictures or graphics.

A dot pattern is picked up as image data by means of a camera, and then, the image data is digitized in no-color 256 gradations. In order to easily recognize dots, the variation of the gradation is differentiated, and then, a dot edge is sharpened. Next, the data on the 256 gradations is binarized to white or black. By means of this binarization, when a dot is printed on paper, a dot print error occurs, the error being caused by a print shift or blurring and a shift when a pixel has been provided. Conventionally, such a print error has been error-checked by means of a parity check. However, these error checks have had: a problem that an error check is made relative to a block of data obtained from a plurality of dots instead of a print error check by dot, making it impossible to determined with which of the dot such a print error has occurred; and a problem that a camera image picking up range must be widely determined.

Further, the above error checks have entailed a problem that a distortion occurs with the dot pattern picked up as an image exerted by a lens distortion or a distortion exerted at the time of oblique image pickup, paper expansion or contraction, medium surface curling, or printing, and then, sophisticated technique is required to correct this distortion.

The present invention has been achieved in order to solve such problems. In other words, it is an object of the present invention to provide an information input/output method using dot patterns, which is capable of imparting information or functions different depending on dots of a dot pattern displayed on a printed matter or the like, thereby defining a large amount of data by means of a dot pattern and, at the time of defining information from that dot pattern, recognizing directivity and speedily defining information; which is capable of checking an error on dot layout state; and further, which is capable of enhancing security.

DISCLOSURE OF THE INVENTION

Claim 1 of the present invention is directed to an information input/output method using dot patterns, the method comprising: defining as a block a rectangular area of a square or a rectangle, of a medium face such as a printed matter; while a straight line in a vertical direction and a horizontal direction configuring a frame of the block is defined as a standard grid line, providing a virtual reference grid point by predetermined interval on the reference grid line; laying out a reference grid point dot on a virtual reference grid point; connecting the virtual reference grid points to each other and defining a straight line parallel to the reference grid line as a grid line; defining a cross point between the grid lines as a virtual grid point; generating a dot pattern obtained by laying out one or a plurality of information dotes, respectively, having a distance and a direction around the virtual grid point; reading such dot pattern as image information by optical reader means; numerically valuing the dot pattern; and reading and outputting information that corresponds to the numerically defined information from storage means.

According to claim 1, information dots can be laid out by grid (first virtual grid point) formed in large amount in blocks, so that more information can be stored in blocks.

In addition, the virtual reference grid point by predetermined direction used herein denotes a predetermined interval in a vertical or horizontal direction; however, this interval may be made different depending on the vertical direction and the horizontal direction.

Claim 2 of the present invention is directed to the information input/output method using dot patterns, as set forth in claim 1, wherein, in the block, assuming an oblique grid line connecting virtual reference grid points in a further oblique direction, a cross point between the oblique grid lines is also defined as a virtual grid point (second virtual grid point); and one or a plurality of dots, each of which has a distance and a direction, are laid out around this virtual grid point.

According to claim 2, information dots can be laid out by virtual grid point that is a cross point between the grid lines in an oblique direction, so that further more information can be stored in blocks.

Claim 3 of the present invention is directed to the information input/output method using dot patterns, as set forth in claim 1 or 2, wherein the dot pattern provides significance of information in accordance with whether or not dots are laid out around the virtual grid point.

According to claim 3, by intentionally generating and laying out a dot-free area, the outer frame of a mask defining an area on a printing face can be expressed. In addition, by laying out dots on all the virtual grid points in a predetermined area, the laid out dots can also be recognized as ordinary background information.

A first algorithm for defining information in accordance with whether or not a dot exists on a virtual grid point and a second algorithm associated with an information dot that exists at a position shifted from a virtual grid point can be mixed with each other, and more information can be laid out.

Claim 4 of the present invention is directed to the information input/output method using dot patterns, as set forth in any one of claims 1 to 3, wherein a key dot defining orientation of the block is laid out at a position shifted from at least one virtual reference grid point on the reference grid line configuring the block.

In this way, the orientation of the block can be defined by laying out the key dot. Utilizing the key dot, the tilting in a predetermined direction can be detected relative to a read axis of optical reader means, so that the read dot pattern can be corrected or the significance different depending on a tilt angle can be provided.

In addition, in the case where such a key dot has been laid out, that portion (reference grid point dot on virtual reference grid line) does not exist because it is substituted for a key dot.

Claim 5 of the present invention is directed to the information input/output method using dot patterns, as set forth in any one of claims 1 to 3, wherein, with respect to an information dot of a predetermined position that is defined as a key dot in the block, the information dot being laid out in a respective one of rectangular areas that exists at a position at which the rectangular area to which the key dot belongs is turned by 90 degrees around the block center, information is defined by a direction or a distance that excludes a direction required to define the key dot.

In the case where an information dot other than a block center is defined as a key dot, there is a possibility that an information dot that exists at a corresponding position when the block center is turned as a rotational axis by 90 degrees cannot be discriminated from a key dot if the information dot is read by optical reader means. According to claim 5, however, in the corresponding rectangular area other than the key dot, the manner of imparting an information dot is made different from usual, thereby making it possible to discriminate the key dot and the information dot from each other.

For example, it is sufficient if a key dot is laid out as a vector in only the vertical and horizontal directions from a virtual grid point and if information is defined in an oblique direction in another rectangular area that exists at a position turned by 90 degrees.

In addition, with respect to a key dot, while a length of a vector is defined as a predetermined length, information may be defined by means of a vector of a different length in another rectangular area that is exists at a position turned by 90 degrees.

In this way, the manner of defining an information dot is determined in advance so as to be different from the manner of defining a key dot with respect to an area in which the key dot can be laid out, whereby an information dot can be laid out with respect to the corresponding area other than the key dot and a dot pattern without wastefulness can be achieved.

In the case where a key dot has been laid out at a block center, with respect to another information dot in a block may, of course, information may be defined depending on which of the vertical, horizontal, and oblique directions is to be determined.

Claim 6 of the present invention is directed to the information input/output method using dot patterns, as set forth in any one of claims 1 to 5, wherein, in an information dot of the block, depending on a position in a block of the information dot, a distance and a direction from the virtual grid point are arbitrarily limited by information dot, and information is defined.

According to claim 6, information can be defined while the distance and direction from the virtual grid point are arbitrarily limited. Therefore, for example, the manner of defining information, by information dot, can be varied by type of industrial field using the dot pattern (by manufacture, by service industrial field or by company using this dot pattern).

In this way, the dot patterns of the present can be utilized discriminatively by limited usage, so that mutual securities can be laid out. In other words, the limited defined information can be provided so as to be readable by optical reader means corresponding thereto.

BRIEF DESCRIPTION OF THE DRAWINGS

FIG. 5 (*b*) shows a case in which four dots are laid out; FIG. 5 (*c*) to (*e*) each show an case in which five dots are laid out; and FIG. 5 (*f*) shows a case in which seven information dots are laid out.

FIG. 6 (*b*) shows an exemplary configuration of 3×3=9 rectangular areas; FIG. 6 (*c*) shows an exemplary configuration of 4×3=12 rectangular areas; and FIG. 6 (*d*) shows an exemplary configuration of 5×5=25 rectangular areas, respectively.

FIG. 8 is an illustrative view depicting a relationship among a true value K, a security table R, and an information dot I for the purpose of illustration of the security of the information dot.

FIGS. 9 (*a*) to (*d*) shows dummy dots and null dots, wherein FIG. 9 (*a*)-1 is an illustrative view of dummy dots; FIG. 9 (*a*)-2 is an illustrative view of null dots; FIG. 9 (*b*) and FIG. 9 (*c*) each are one example of a printed matter; FIG. 9 (*d*)-1 is an exemplary layout of dot patterns restricting the boundary between two masks by means of null dots; and FIG. 9 (*d*)-2 is an illustrative view depicting an exemplary layout of dot patterns restricting the boundary between a null dot and a background by means of null dots.

BEST MODE FOR CARRYING OUT THE INVENTION

Hereinafter, preferred embodiments of the present invention will be described with reference to the accompanying drawings.

Figure 1:
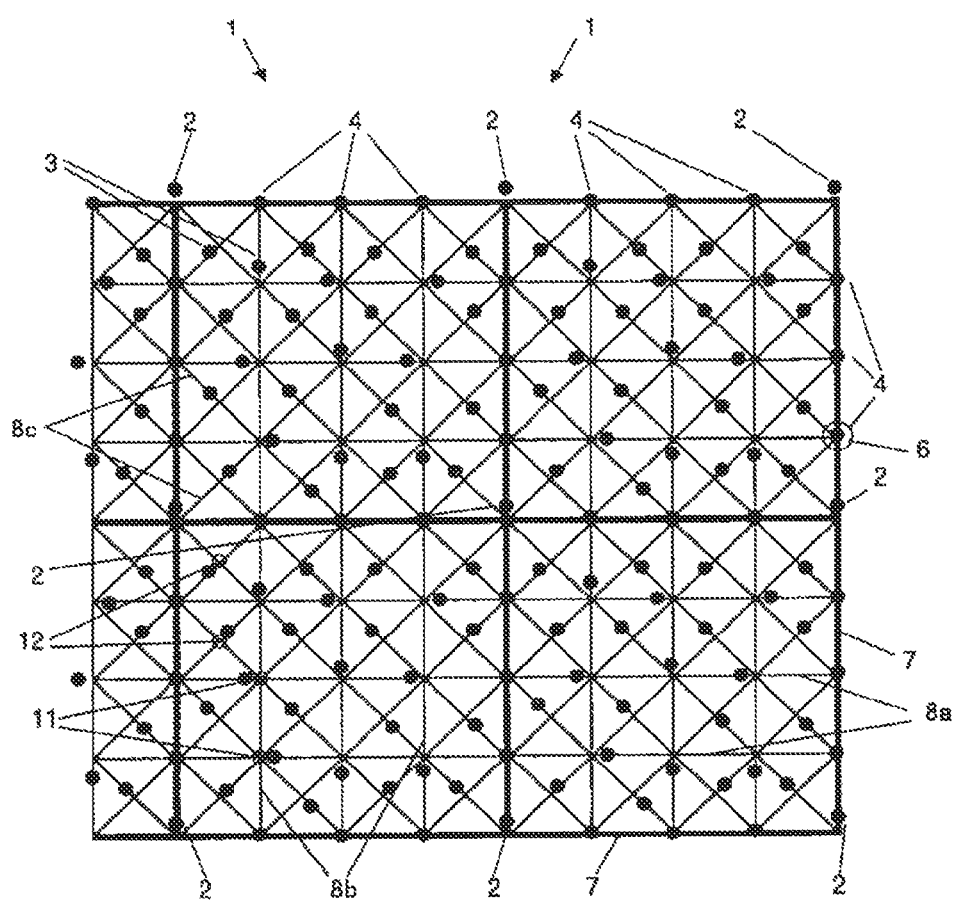
FIG. 1 is an illustrative view depicting one example of a dot pattern.
Figure 2:
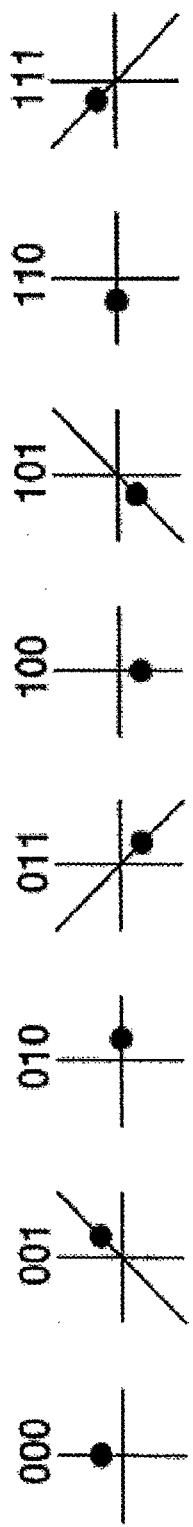
FIG. 2 is an enlarged view showing an example of information dots in a dot pattern.

FIG. 1 is an illustrative view depicting one example of a dot pattern of the present invention; FIG. 2 is an enlarged view showing one example of information dots of a dot pattern and bit representation of data defined therein; and FIG. 3 (a), FIG. 3 (b), and FIG. 3 (c) are illustrative views each depicting how key dots and information dots are laid out.

The information input/output method using dot patterns, according to the present invention, is comprised of: recognition of a dot pattern 1; and means for outputting information and programs from this dot pattern 1.

In other words, the dot pattern 1 is picked up as image data by means of a camera; a reference grid point dot 4 is first extracted, and then, the thus extracted dot is determined to be at a position of a virtual reference grid point 6; and a straight line connecting these virtual reference grid points 6 is defined as a reference grid line 7. In the case where the reference grid point dots 4 are not laid out at position of the virtual grid points 6 at which the dots should be, dots at the periphery of this virtual reference grid points 6 are extracted, and the extracted dots each are defined as a key dot 2 (rectangular parts at four corners of a block). Next, vertical and horizontal grid lines 8a, 8b connecting the virtual reference grid points 6 are set, and then, a cross points between the grid lines 8a and 8b is defined as a virtual grid point 11 (first virtual grid point). Then, the dots at the periphery of this virtual grid point 11 are retrieved, and then, an information dot 3 defined depending on the distance and direction from the virtual grid point is extracted.

In addition, assuming an oblique grid line 8c connecting the virtual reference grid points 6 to each other in an oblique direction, a cross point of these oblique grid lines 8c is also defined as a virtual grid point 12 (second virtual grid point). Then, the dots at the periphery of this virtual grid point 12 are also retrieved, and then, the information dot 3 defined depending on the distance and direction from the virtual grid point 12 is extracted.

Next, the orientation of the block is determined depending on the direction from the virtual reference grid point 6 or virtual grid point 11 of a key dot 2. For example, in thee case where the key dot 2 has been shifted in the +y direction from a virtual grid point, the information dot 3 in a block may be recognized while a vertical direction is defined as a forward direction.

Further, if the key dot 2 is shifted in the -y direction from the virtual reference grid point 6 or virtual grid point 11, the information dot 3 in a block may be recognized while the direction in which the block has been rotated at 180 degrees around a block center is defined as a forward direction.

Furthermore, if the key dot 2 is shifted in the -x direction from the virtual reference grid point 6 or virtual grid point 11, the information dot in a block may be recognized while the direction in which the block has been rotated clockwise at an angle of 90 degrees around a block center is defined as a forward direction.

Moreover, if the key dot 2 is shifted in the +x direction from the virtual reference grid point 6 or virtual grid point 11, the information dot 3 in a block may be recognized while the direction in which the block has been rotated counterclockwise at an angle of 90 degrees around a block center is defined as a forward direction.

If images of dot patterns read by optical reader means are accumulated in a frame buffer, a central processing unit (CPU) of the optical reader means analyzes dots in the frame buffer, and then, decodes the numeric values defined by information dot 3 depending on the distance and direction from virtual grid points 11, 12 of information dots 3. As the xy coordinate or codes, these numeric values are cross-checked with information stored in the optical reader means or memory of a personal computer; and the voice, images, mobile images, and programs or the like corresponding to the xy coordinate or codes are read out, and then, are outputted from a voice/image output means or the like.

In generation of the dot pattern 1 of the present invention, in accordance with an algorithm for generating a dot code, in order to recognize information such as a voice, fine dots, i.e., the key dot 2, the information dot 3, and reference grid point dot 4 are arranged under a predetermined rule.

As shown in FIG. 1, a rectangular area such as a square or a rectangle, of a medium face such as a printed matter, is defined as a block 1. In addition, while straight lines in the vertical and horizontal directions configuring a frame of the block 1 each are defined as a reference grid line 7 (lines indicated by thick lines in FIG. 1), virtual reference grid points 6 are provided at predetermined intervals on the reference grid line 7, and then, reference grid point dots 4 are laid out on the virtual reference grid points 6. Next, straight lines connecting the virtual reference grid points 6 to each other and parallel to the reference grid line 7 are defined as grid lines 8a, 8b and a cross point between the grid lines 8a and 8b is defined as a virtual grid point 11 (first virtual grid point).

Still furthermore, an oblique grid line 8c connecting the virtual reference grid points 6 to each other in an oblique direction is set and a cross point between these oblique grid lines 8c is defined as a virtual grid point 12 (second virtual grid point).

One or plurality of information dots 3 having a distance and a direction around the thus set grid point are laid out, respectively, to generate a dot pattern.

When this dot pattern 1 is picked up as image data by means of a camera, lens distortion of the camera or a distortion exerted at the time of oblique image pickup, paper expansion and contraction, medium surface curling, or printing can be corrected by means of the reference grid point dots 4. Specifically, a correction function $(X_n, Y_n) = f(X'_n, Y'_n)$ is obtained for converting distorted four virtual grid points into an original square, information dots are corrected by the same function, and the vector of correct information dot 3 is obtained.

If the reference grid point dots are laid out in the dot pattern 1, the image data obtained by picking up this dot pattern 1 by means of a camera corrects the distortion caused by the camera, so that, when the image data on the dot pattern 1 is picked up by means of a general type camera having a lens with a high distortion rate mounted thereon as well, the image data can be precisely recognized. In addition, even if the camera is tilted relative to a face of the dot pattern 1, the dot pattern 1 can be precisely recognized.

The key dot 2, as shown in FIG. 1, serves as a dot laid out depending on a distance and a direction around one virtual grid point 11 that exists at a substantially central position of virtual grid points laid out in a rectangular shape. This key dot 2 serves as a representative point of the dot pattern 1 for one block representative of a group of information dots. For example, these dots are laid out at the positions shifted by 0.2 mm upwardly of a virtual grid point at the block center of the dot pattern 1. Therefore, in the case where the information dot 3 is defined by X, Y coordinate values from a virtual grid point, the position distant at a distance of 0.2 mm downwardly of the key dot 2 is defined as a virtual grid point (coordinate point). However, this numeric value 80.2 mm) can vary according to whether the block of the dot patterns 1 is large or small in size without being limitative thereto.

The information dot 3 serves as a dot for recognizing a variety of information. In the case of FIG. 1, the information dots 3 are laid out at the periphery thereof while the key dot is defined as a representative point and are laid out at end points expressed by means of a vector while the center surrounded by four virtual grid points 11 (first virtual grid points) is defined as a virtual grid point (second virtual grid point), and then, the defined grid point is defined as a start point. For example, this information dot 3 is surrounded by means of virtual grid points 11, 12. As shown in FIG. 2, the dots that are distant by 0.2 mm from the virtual point are laid out in eight directions while they are rotated clockwise by 45 degrees in order to provide the direction and length that are expressed by the vector, and then, three bits are expressed.

With reference to the figure, 3 bits×16=48 bits can be expressed in a dot pattern 1 of one block.

While, in the illustrative embodiment, the dots layout is provided in the eight directions to express three bits, the dot layout can be provided in 16 directions to express four bits and, of course, the dot layout can be variously changed.

It is desirable that the diameter of the key dot 2, information dot, or reference grid point dot 4 be on the order of 0.1 mm in consideration of appearance, precision of printing relative to paper, camera resolution and optimal digitization.

In addition, it is desirable that intervals of reference grid point dots 4 be on the order of 1 mm vertically and horizontally in consideration of incorrect recognition of a variety of dots 2, 3, 4. It is desirable that the distortion of the key dot 2 be on the order of 20% of the grid intervals.

It is desirable that a gap between this information dot 3 and a virtual grid point 11, 12 be on the order of 15% to 30% of a distance between the virtual grid points 11 and 12 adjacent thereto. The reason therefor is set forth as follows. If the distance between the information dot and the virtual grid point 11, 12 is longer than this interval, dots are easily visually recognized as a large block, and the dot pattern 1 is eyesore. On the other hand, if the distance between the information dot 2 and the virtual grid point 11, 12 is shorter than the above interval, it becomes difficult to determine that the target dot is an information dot 3 having vector directivity around either of the virtual grid points 11, 12 adjacent thereto.

Figure 3:
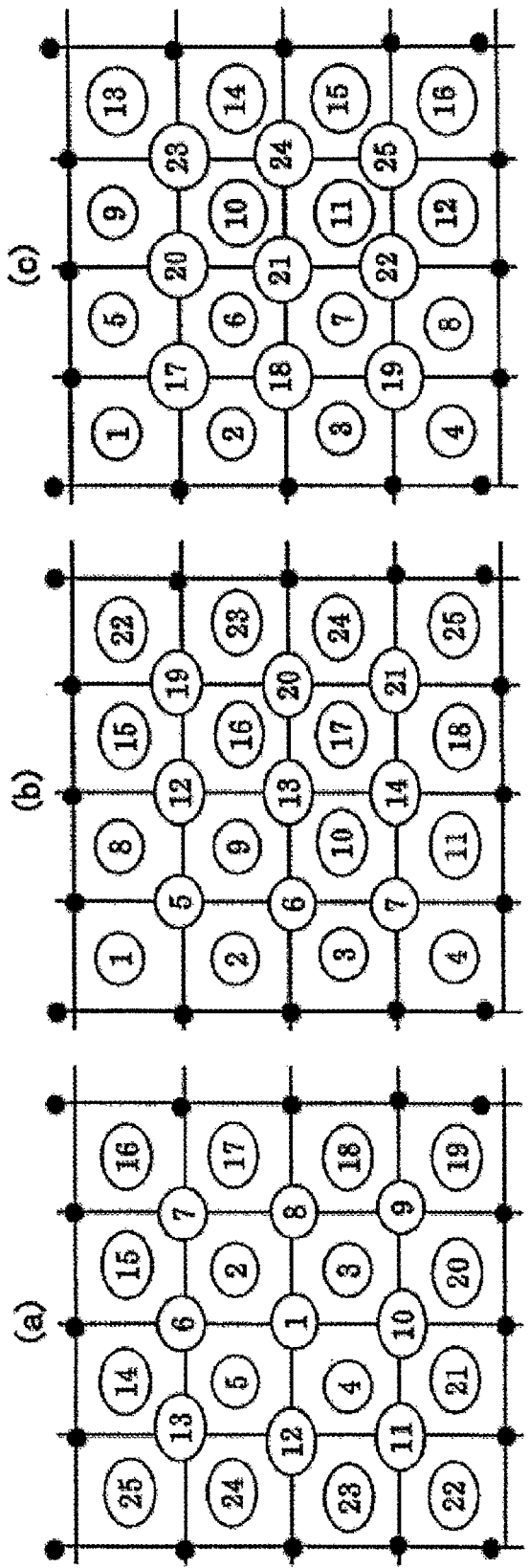
FIG. 3 (*a*), FIG. 3 (*b*), and FIG. 3 (*c*) are illustrative views depicting how key dots and information dots are laid out.

FIG. 3 shows a sequential order of reading information dots 3 in a block, wherein the numbers circled in the figure denotes a layout area of the information dots laid out by virtual grid points 11, 12, respectively.

For example, in the case of FIG. 3 (*a*), (1) to (25) are laid out clockwise therefrom around (1) of as block center (this denotes number "1" circled in the figure). At this time, the grid interval is 1 mm, for example, and 3 bits×16=48 bits is expressed by 4 mm×4 mm.

In FIG. 3 (*b*), after from an information dot (1) in the rectangular area at the left top of a block to an information dot (4) have been laid out sequentially in a vertical direction, information dots (5) to (7) are laid out at cross points between the grid lines in the vertical and horizontal direction.

In FIG. 3 (*c*), after an information dot (1) in the rectangular area at the left top of a block to an information dot (16) have been laid out sequentially in a vertical direction, information dots (17) to (25) are laid out alternately at a cross point between the vertical and horizontal grid lines.

Figure 4:
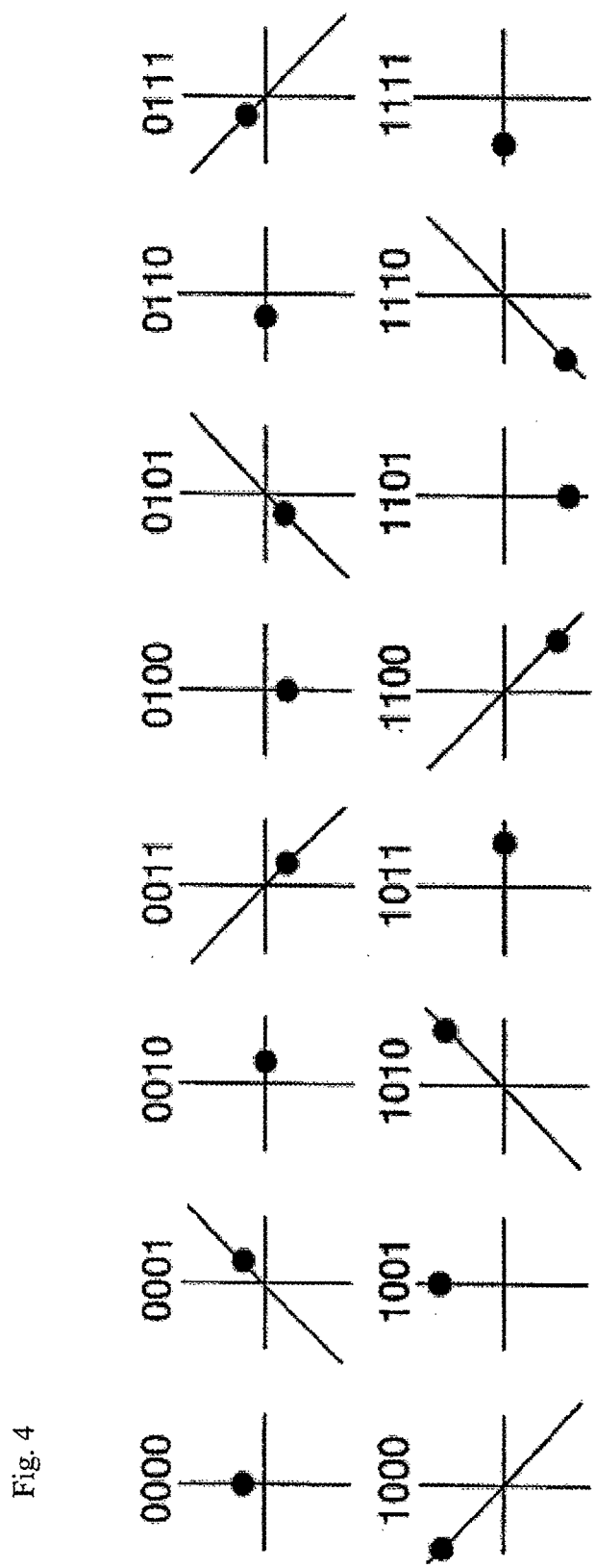
FIG. 4 shows an example of information dots and bit representation of data defined therein.

FIG. 4 shows an example of an information dot 3 and bit representation of data defined therein and shows another aspect of the invention.

In addition, if eight vector directions are defined with the use of two types of dot i.e., a long dot (upper stage of FIG. 4) and a short dot (lower stage of FIG. 4) from the virtual grid points 11, 12 surrounded by the reference grip point dot 4 relative to the information dot 3, four bits can be expressed. At this time, it is desirable that the long dot be on the order of 25% to 30% of a distance between the virtual grid points 11 and 12 adjacent thereto and that the short dot be on the order of 15% to 20% thereof. However, it is desirable that a central interval of the long and short be longer than the diameter of each of these dots.

It is desirable that the information dot 3 surrounded by four virtual grid points 11, 12 be one dot in consideration of appearance. However, in the case where an attempt is made to increase the amount of information while ignoring the appearance, a large amount of information can be provided by assigning one bit, and then, expressing information dots 3 in plurality. For example, in concentric eight-directional vectors, information for 2 can be expressed by means of a information dot 3 and $2^{128}$ is obtained by 16 information dots in one block.

Figure 5:
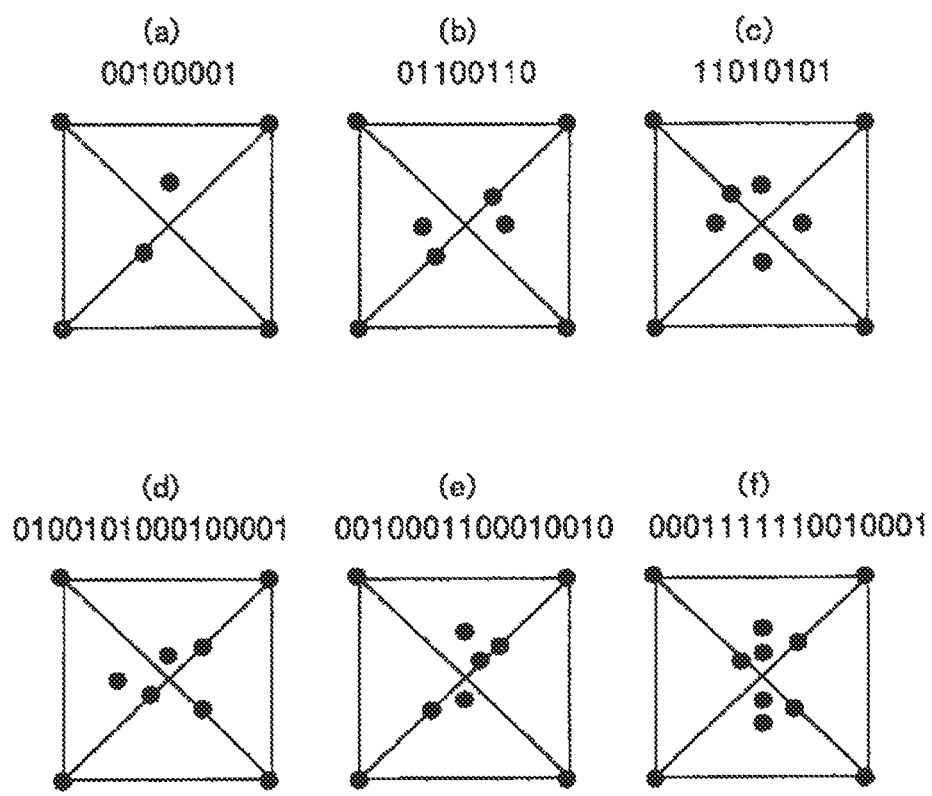
FIGS. 5 (*a*) to (*f*) each show an example of information dots and bit representations defined therein, wherein FIG. 5 (*a*) shows a case in which two dots are laid out.

FIGS. 5 (*a*) to (*f*) each show an example of an information dot 3 and bit representation of data defined therein, wherein FIG. 5 (*a*) shows a case in which two dots are laid out; FIG. 5 (*b*) shows a case in which four dots are laid out; and FIG. 5 (*c*) to FIG. 5 (*e*) each show a case in which five dots are laid out; and FIG. 5 (*f*) shows a case in which seven dots are laid out.

Figure 6:
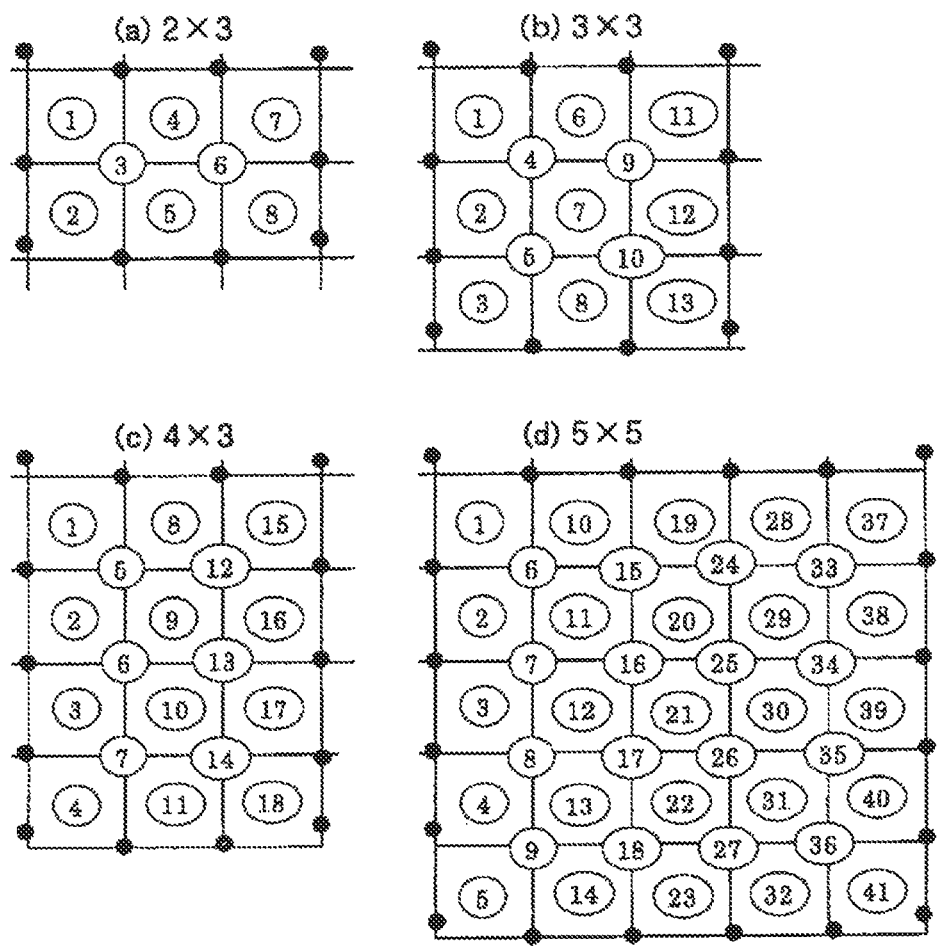
FIGS. 6 (*a*) to (*d*) are views each showing an exemplary configuration of a block, wherein FIG. 6 (*a*) shows an exemplary configuration of 2×3=6 rectangular areas.

FIGS. 6 (*a*) to (*d*) each show modification of a dot pattern, wherein FIG. 6 (*a*) shows a case in which eight information dots 3 are laid out in a block; FIG. 6 (*b*) shows a case in which 18 information dots are laid out therein; FIG. 6 (*c*) shows a case in which 13 information dots are laid out; and FIG. 6 (*d*) shows a case in which 41 information dots 3 are laid out.

Each of the dot patterns 1 shown in FIGS. 1 and 3 described previously also shows an example in which 25 information dots 3 are laid out in one block. However, these information dots 3 can be variously changed without being limitative thereto. For example, according to a large or small amount of information required or camera resolution, eight information dots 3 may be laid out in one block (FIG. 6 8*a*); 13 information dots may be laid out in one block (FIG. 6 (*b*); 18 information dots 3 are laid out in one block (FIG. 6 (*c*)); or 41 information dots 3 are laid out in one block (FIG. 6 (*d*)).

Figure 7:
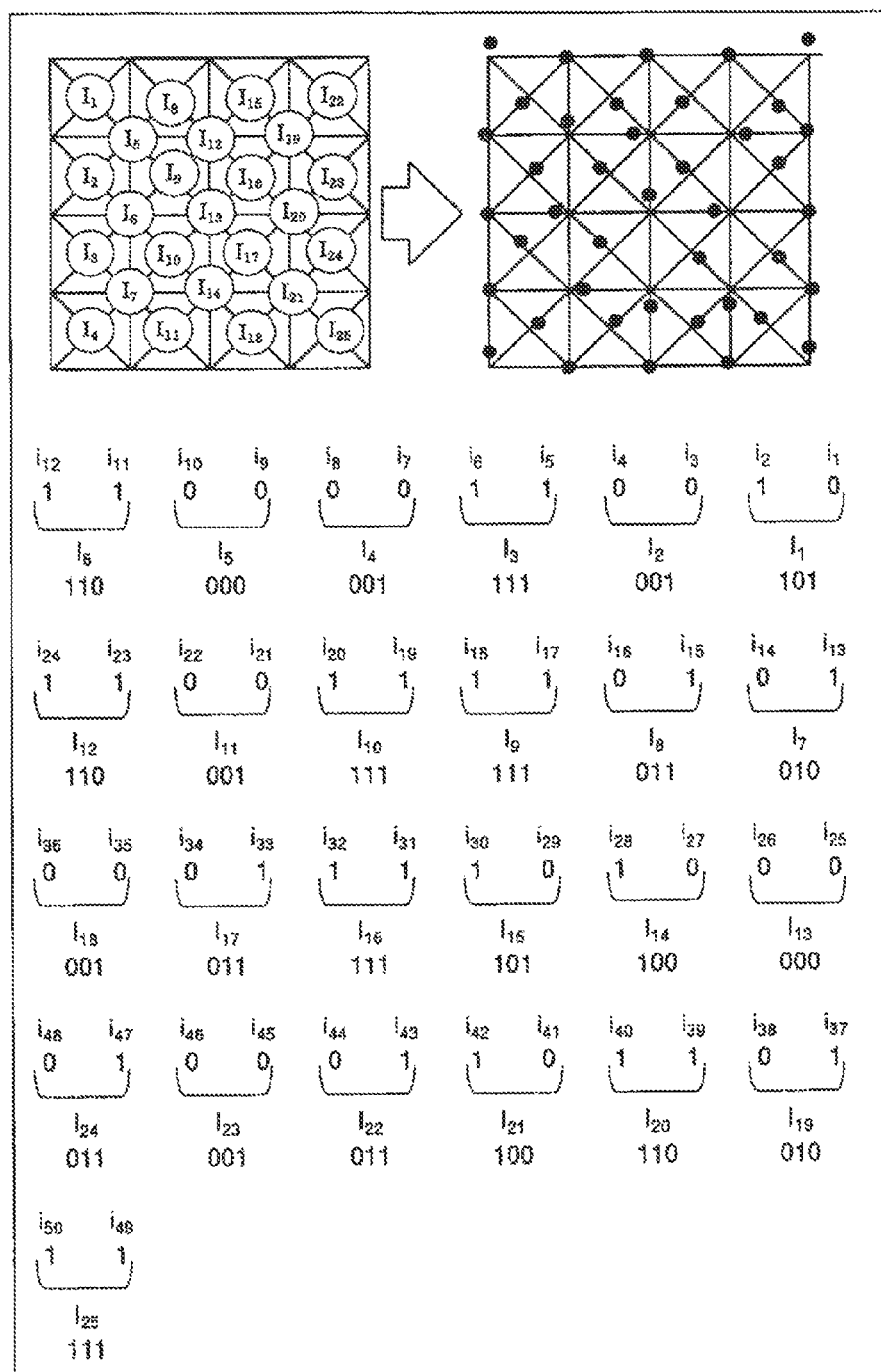
FIG. 7 is an illustrative view of a method for assigning "0" and "1" to least significant bits and checking an error of an information dot.

FIG. 7 is an illustrative view of a method for assigning "0" and "1" to the least significant bits and checking an information dot error.

Further, one information dot 3 is uniformly laid out and "0" and "1" are alternately assigned to the least significant bits so that they are used for checking an error, thereby making it possible to check an error of this information dot 3. In this error check system, information dots are generated alternately in the vertical, horizontal, and 45-degree tilt directions, making it possible to eliminate the regularity of a dot pattern. In other words, the information dots obtained by alternately assigning "0" and "1" to the least significant bits are always positioned in the vertical, horizontal, or 45-degree tilt direction around the virtual grid points 11, 12. Therefore, when the information dots 3 are positioned in a direction other than the horizontal or 45-degree tilt direction, these dots are determined as those displayed at their appropriate positions. In this way, an error inputted when the information dots 3 are shifted in a rotational direction around the virtual grid points 11, 12 can be reliably checked.

When the information dots 3 are determined as eight directions (45-degree intervals) and as long/short dots (refer to FIG. 4), if the least significant one bit is "0" or "1", among four bits, in the case where the above one bit is shifted to one of the positions of the adjacent three dots (concentric circle±two points at 45-degree rotation position+either one of long and short dots), it can be handled as an error and 100% error check can be made.

FIG. 8 is an illustrative view depicting how information dots $I_1$ to $I_{16}$ are arranged in order to explain the security of information dots.

For example, in order to disable visually reading data on a dot pattern 1, the computation expressed by a function f ($K_n$) is carried out with respect to $I_n$ of an information dot 3; $I_n = K_n + R_n$ is expressed by means of the dot pattern 1; a dot pattern $I_n$ is inputted; and thereafter, $K_n = I_n - R_n$ is obtained.

Alternatively, in order to disable visually reading data on the dot pattern 1, a plurality of information dots are laid out in one column with a key dot 2 being a representative point and such one train is laid out in plurality of trains, and then, a difference in data between two trains adjacent to each other is handled as data on the information dot 3, whereby the information dots 3 each can be laid out so that regularity of the information dots 3 is eliminated.

In this manner, the security can be enhanced in order to disable visually reading the dot pattern 1 printed on a medium face. In addition, when the dot pattern 1 has been printed on the medium face, the information dots 3 are laid out in random, a pattern is eliminated, and the dot pattern can be made moderate.

FIGS. 9 (a) to (d) show dummy dots, wherein FIG. 9 (a) is an illustrative view of dummy dots; FIG. 9 (b) shows one example of a printed matter; FIG. 9 (c) shows an area in a printed matter; and FIG. 9 (d) is an illustrative view depicting an example of laying out dot patterns that restrict the boundary of a mask by means of dummy dots.

A dot is laid out at a central position (second virtual grid point) of four virtual grid points 11 (first virtual lattice points), and this dot is defined as a dummy dot 5 to which no information is imparted (FIG. 9 (a)). This dummy dot 5 can be used for numeric data or areas in which X, Y coordinate values have been defined and the boundary between the areas, numeric data or an area in which the X, Y coordinate values are not defined.

For example, as shown in FIG. 9 (a), three types of patterns such as lesser bear, hippopotamus, or sum are printed on a printed matter, and then the areas corresponding to these three patterns are laid out as mask 1, mask 2, and mask 3, as shown in FIG. 9 (c). As shown in FIG. 9 (d), the dummy dot 5 is laid out at the boundary of mask 1 and mask 2.

In the case where the dummy dot 5 is used for the boundary, there is no need for defining all of the blocks of the corresponding positions as dummy dots 5, and it is sufficient if a minimum dot is defined as a dummy dot in order to indicate the boundary.

In addition, a dummy dot is laid out in an area other than the masks, and an area in which no information is defined can be provided.

When the dot pattern 1 is picked up as image data by means of a camera, the X, Y coordinate values are calculated at the positions of the key dot 2 that is a representative point of information, and thereafter, the coordinate values are compensated for by means of the increments of the X, Y coordinate values at the representative points adjacent to each other and a distance from an image pickup center to the key dot 2 on which the X, Y coordinate values have been calculated.

Alternatively, when the block of dot patterns 1 is picked up as image data by means of a camera, information dots are sequentially read from the information dots that exist at the periphery of the image pickup center of the camera in an area in which identical data is defined in blocks or an area in which the X, Y coordinate values are defined, and then, information dots 3 equivalent to one block are read, whereby the dot pattern 1 is read in a minimum area from the image pickup center of the camera, and then, data at the image pickup central position is calculated.

Figure 10:
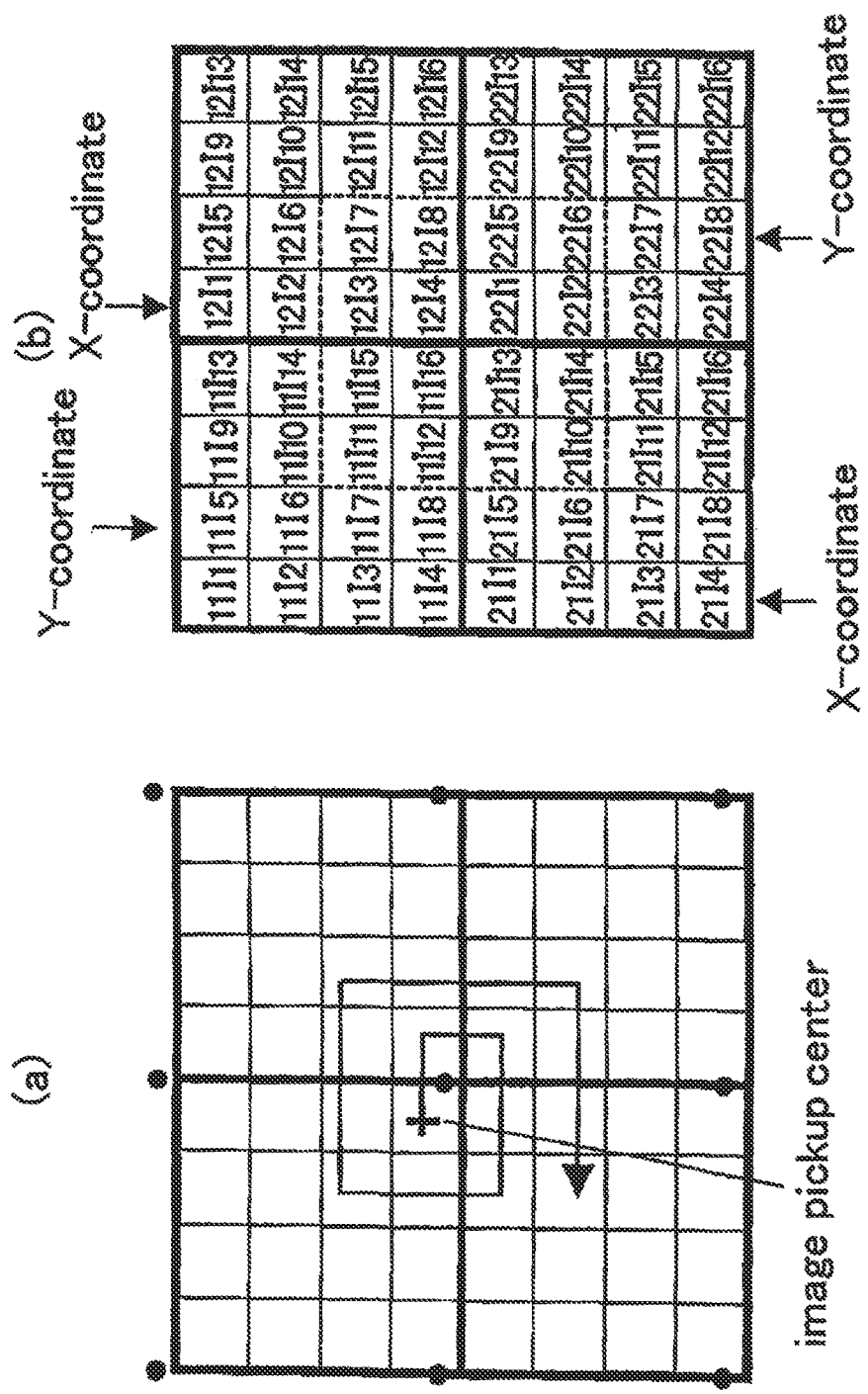
FIG. 10 (a) is an illustrative view depicting a sequential order of inputting information dots and FIG. 10 (b) is an illustrative view depicting a method for reading dot patterns and calculating X and Y coordinate values.

FIG. 10 (a) shows sequential order of information dots equivalent to one block in a minimum area from the image pickup center of the camera. 4×4 columns=16 information dots are inputted clockwise.

FIG. 10 (b) is an illustrative view depicting a method for reading a dot pattern and calculating X, Y coordinate values.

As illustrated, the X, Y coordinate values to be obtained are defined as X, Y coordinate values of a block having the camera image pickup center. With respect to the X, Y coordinate values, if the increment is defined as +1 in the X direction (right direction) and in the Y direction (upper direction) by block, there is a need for compensating for the information dots inputted from another block. $K_8 \, K_7 \, K_6 \, K_5$ ($i_{16} \, i_{15} \, i_{14} \, i_{13} \, i_{12} \, i_{11} \, i_{10} \, i_9$) indicating the X-coordinate value and $K_4 \, K_3 \, K_2 \, K_1$ ($i_8 \, i_7 \, i_6 \, i_5 \, i_4 \, i_3 \, i_2 \, i_1$) indicating the Y-coordinate value are targeted for compensation. Other coordinate values $K_{16}$ to $K_9$ ($i_{32}$ to $i_{17}$) become identical in any block, and there is no need for compensation.

These calculations are obtained by formula 1 below. Even if a digit is risen by means of calculation in [ ], it is assumed that the columns of bits preceding [ ] are not adversely affected. If an error check bit is excluded from among an information dot I, the bit is defined as K.

① In the case where $_{11}I_{11}$ is a start point (camera image pickup center)

$$X \text{ coordinate} = {}_{11}K_8 \cdot {}_{11}K_7 \cdot {}_{11}K_6 \cdot {}_{21}K_5$$

$$Y \text{ coordinate} = {}_{12}K_4 \cdot {}_{12}K_3 \cdot {}_{12}K_2 \cdot [{}_{22}K_1 + 1]$$

② In the case where $_{11}I_{15}$ is a start point (camera image pickup center)

$$X \text{ coordinate} = {}_{12}K_8 \cdot {}_{12}K_7 \cdot {}_{12}K_6 \cdot {}_{22}K_5 - 1$$

$$Y \text{ coordinate} = {}_{12}K_4 \cdot {}_{12}K_3 \cdot {}_{12}K_2 \cdot [{}_{22}K_1 + 1]$$

③ In the case where $_{12}I_3$ is a start point (camera image pickup center)

$X$ coordinate$=_{12}K_8 \cdot _{12}K_7 \cdot _{12}K_6 \cdot _{22}K_5$ $Y$ coordinate$=_{12}K_4 \cdot _{12}K_3 \cdot _{12}K_2 \cdot [_{22}K_1+1]$ ④ In the case where $_{11}I_7$ is a start point (camera image pickup center)

$X$ coordinate$=_{12}K_8 \cdot _{12}K_7 \cdot _{12}K_6 \cdot _{22}K_5$ $Y$ coordinate$=_{12}K_4 \cdot _{12}K_3 \cdot _{12}K_2 \cdot [_{22}K_1+1]$ ⑤ In the case where $_{11}I_{12}$ is a start point (camera image pickup center)

$X$ coordinate$=_{11}K_8 \cdot _{11}K_7 \cdot _{21}K_6 \cdot _{21}K_5$ $Y$ coordinate$=_{12}K_4 \cdot _{12}K_3 \cdot [_{22}K_2 \cdot _{22}K_1+1]$ ⑥ In the case where $_{11}I_{16}$ is a start point (camera image pickup center)

$X$ coordinate$=_{12}K_8 \cdot _{12}K_7 \cdot _{22}K_6 \cdot _{22}K_5-1$ $Y$ coordinate$=_{12}K_4 \cdot _{12}K_3 \cdot [_{22}K_2 \cdot _{22}K_1+1]$ ⑦ In the case where $_{12}I_4$ is a start point (camera image pickup center)

$X$ coordinate$=_{12}K_8 \cdot _{12}K_7 \cdot _{22}K_6 \cdot _{22}K_5$ $Y$ coordinate$=_{12}K_4 \cdot _{12}K_3 \cdot [_{22}K_2 \cdot _{22}K_1+1]$ ⑧ In the case where $_{12}I_8$ is a start point (camera image pickup center)

$X$ coordinate$=_{12}K_8 \cdot _{12}K_7 \cdot _{22}K_6 \cdot _{22}K_5$ $Y$ coordinate$=_{12}K_4 \cdot _{12}K_3 \cdot [_{22}K_2 \cdot _{22}K_1+1]$ ⑨ In the case where $_{21}I_9$ is a start point (camera image pickup center)

$X$ coordinate$=_{11}K_8 \cdot _{21}K_7 \cdot _{21}K_6 \cdot _{21}K_5$ $Y$ coordinate$=_{12}K_4 \cdot _{12}K_3 \cdot [_{22}K_2 \cdot _{22}K_1+1]-1$ ⑩ In the case where $_{21}I_{13}$ is a start point (camera image pickup center)

$X$ coordinate$=_{12}K_8 \cdot _{22}K_7 \cdot _{22}K_6 \cdot _{21}K_5-1$ $Y$ coordinate$=_{12}K_4 \cdot _{12}K_3 \cdot [_{22}K_2 \cdot _{22}K_1+1]-1$ ⑪ In the case where $_{22}I_1$ is a start point (camera image pickup center)

$X$ coordinate$=_{12}K_8 \cdot _{22}K_7 \cdot _{22}K_6 \cdot _{22}K_5$ $Y$ coordinate$=_{12}K_4 \cdot _{12}K_3 \cdot [_{22}K_2 \cdot _{22}K_1+1]-1$ ⑫ In the case where $_{22}I_5$ is a start point (camera image pickup center)

$X$ coordinate$=_{12}K_8 \cdot _{22}K_7 \cdot _{22}K_6 \cdot _{22}K_5$ $Y$ coordinate$=_{12}K_4 \cdot _{12}K_3 \cdot [_{22}K_2 \cdot _{22}K_1+1]-1$ ⑬ In the case where $_{21}I_{10}$ is a start point (camera image pickup center)

$X$ coordinate$=_{21}K_8 \cdot _{21}K_7 \cdot _{21}K_6 \cdot _{21}K_5$ $Y$ coordinate$=_{22}K_4 \cdot _{22}K_3 \cdot _{22}K_2 \cdot _{22}K_1$ ⑭ In the case where $_{21}I_{14}$ is a start point (camera image pickup center)

$X$ coordinate$=_{22}K_8 \cdot _{22}K_7 \cdot _{22}K_6 \cdot _{22}K_5$ $Y$ coordinate$=_{22}K_4 \cdot _{22}K_3 \cdot _{22}K_2 \cdot _{22}K_1$ ⑮ In the case where $_{22}I_2$ is a start point (camera image pickup center)

$X$ coordinate$=_{22}K_8 \cdot _{22}K_7 \cdot _{22}K_6 \cdot _{22}K_5$ $Y$ coordinate$=_{22}K_4 \cdot _{22}K_3 \cdot _{22}K_2 \cdot _{22}K_1$ ⑯ In the case where $_{22}I_6$ is a start point (camera image pickup center)

$X$ coordinate$=_{22}K_8 \cdot _{22}K_7 \cdot _{22}K_6 \cdot _{22}K_5$ $Y$ coordinate$=_{22}K_4 \cdot _{22}K_3 \cdot _{22}K_2 \cdot _{22}K_1$  <Formula 1>

When the dot pattern 1 is picked up as image data by means of the camera, if an error has occurred with the information dot 3, the closest information dot 3 equivalent to the information dot 3 is read, and then, the error is corrected, whereby the dot pattern 1 can be read in the minimum area from the image pickup center of the camera.

Utilizing the method for picking up information described above, a tablet or a digitizer that uses the XY coordinate and an input interface can be practiced. For example, with respect to the tablet or the digitizer, a transparent sheet on which the dot pattern 1 has been printed is superimposed on a target; an image is picked up by means of the camera; and then, the XY coordinate values of the dot pattern 1 are inputted.

Next, with reference to FIGS. 11 to 14, a description will be given in further detail with respect to a case in which key dots 2 have been laid out at the positions different from those shown in FIG. 1 and a method of making searches for information dots 3 and key dots 2 in that case.

When an image pickup element such as a CCD or a CMOS serving as optical image pickup means first picks up reflection light of irradiation light irradiated on a medium face, the image pickup data (image data) is expanded on a memory frame buffer. Next, a central processing unit (CPU) of the optical image pickup means starts a search for the image data expanded on the frame buffer by means of a search program read out from the memory.

Figure 11:
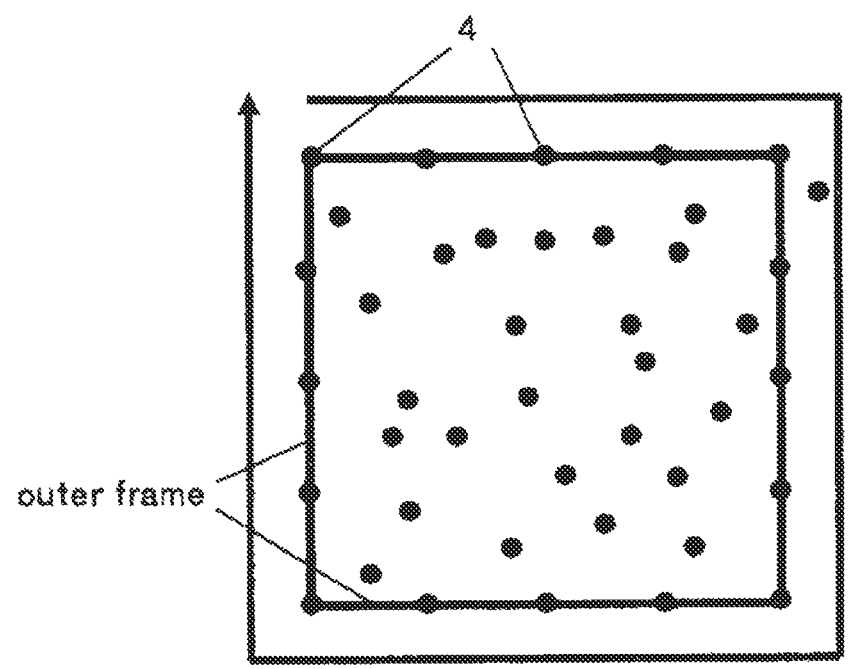
FIG. 11 is a view showing a relationship in layout between a reference grid line configuring an outer frame of a block and a reference grid point dot.
Figure 12:
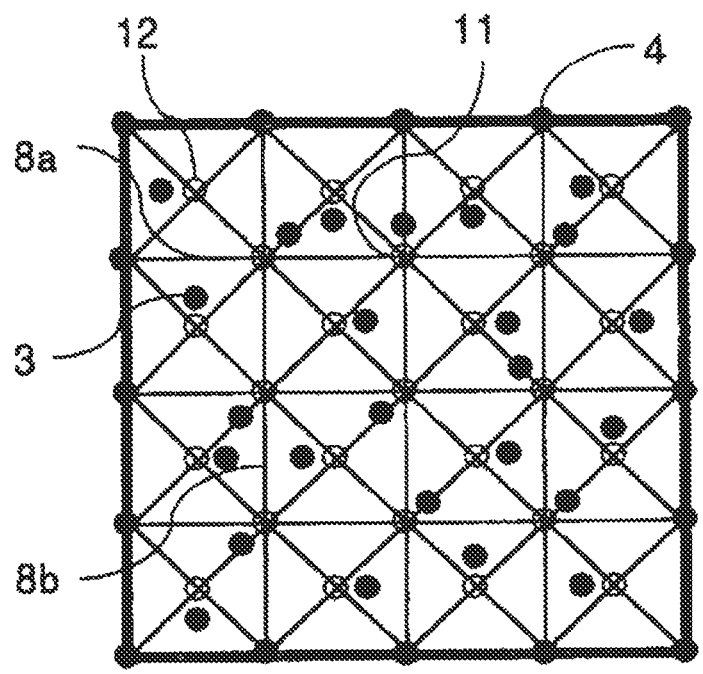
FIG. 12 is a view showing a relationship in layout between a grid line, an oblique grid line, and a virtual grid point and an information dot.

At this time, reference grid point dots 4 configuring an outer frame of a block are linearly laid out at predetermined intervals, so that the central processing unit (CPU) determines whether or not a straight line is substantially obtained by connecting these linearly laid out dots to each other (refer to FIG. 11).

Then, it is determined whether or not the dots existing on the reference grid line 78 are laid out by predetermined length. At this time, if a distance between dots is equal to another distance, such dots are determined to be reference grid point dots 4. In the case where dots are laid out differently, these dots are determined to be key dots 2 (FIG. 14).

Next, reference grid point dots 4 in the vertical and horizontal directions (virtual reference grids 6) are connected to each other by means of straight lines (grid lines 8a, 8b), a cross point therebetween is defined as a virtual grid point 11 (first virtual grid point). Next, virtual reference grid points 6 in the oblique direction are connected to each other, an oblique grid line 8c is defined, and a cross point between these oblique grid lines 8c is further defined as a virtual grid point 12 (second virtual grid point).

Figure 13:
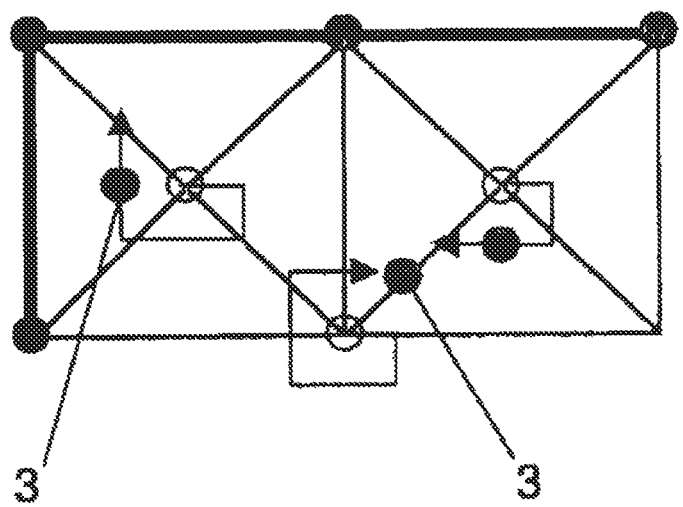
FIG. 13 is a view for explaining a method for retrieving an information dot 3 around a virtual grid point.

Next, while either of the above two types of virtual grid points 11, 12 is defined as a start point, a search is made for information dots in a spiral manner (refer to FIG. 13).

Figure 14:
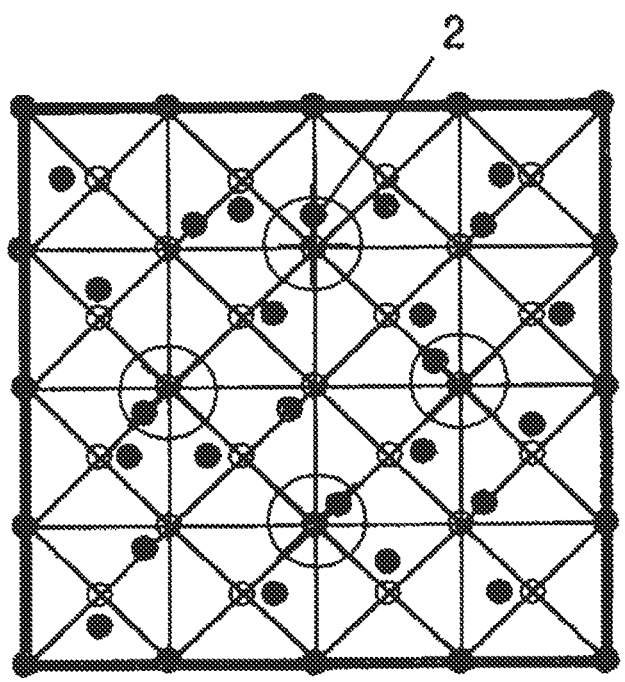
FIG. 14 is a view for explaining a relationship in layout between a block orientation and a key dot.

Then, with respect to four portions (four virtual grid points existing at positions at which intervals are equal to each other in the vertical and horizontal directions from a block center in FIG. 14) at which key dots 2 can be laid out in a block, it is determined which of the dots is a key dot 2, with reference to the orientation and length of a respective one of the information dots 3 from the virtual grid points. In this manner, the information possessed by information dots 3 is determined by identifying the orientation.

As shown in FIG. 14, in the case where an information dot 3 other than a block center is defined as a key dot 2 (in the case of FIG. 14, where the position shifted in the upward direction by one virtual grid point from a block center is defined as the layout position of the key dot 2), there is a possibility that an information dot 3 that exists at a corresponding position when the block center is turned as a rotational axis by 90 degrees cannot be discriminated from a key dot 2 if the information dot is read by optical reader means. However, the manner of imparting the information dot 3 in the corresponding rectangular area other than the key dot 2 is made different, whereby the key dot 2 and the information dot 3 can be discriminated from each other.

For example, as shown in FIG. 14, it is sufficient if the key dot 2 is laid out as a vector in only the vertical and horizontal directions from a virtual reference grid point 6 and if information is defined in an oblique direction in another rectangular area existing at a position turned by 90 degrees.

In addition, with respect to the key dot 2, while length of a vector is defined as a predetermined length, information may be defined by means of a vector different from another one in another rectangular area existing at a position turned by 90 degrees.

In the case where the key dot 2 has been laid out at the block center, with respect to another information dot 3, information may be defined in any of the vertical, horizontal, and oblique directions.

The dot pattern 1 of the present invention, as described above, is printed on a printed matter such as a picture book or a text, and then, image data is picked by means of the camera. From the image data, a search is made for positions of information dots. From information on the positions, codes or XY coordinates are decoded. The voices, still pictures, motion pictures, characters, programs or the like corresponding to the codes or XY coordinates, are outputted from constituent elements such as a liquid crystal display device, s speaker, and a voice/image output terminal of equipment such as a personal computer, an information output device, a PDA (Personal Data Assistant), or a portable cellular phone.

With respect to an information dot 3 of the block, information may be defined depending on a position that exists in the block of the information dot 3 while the distance and direction from the virtual grid points 11, 12 are arbitrarily limited by information dot 3.

More specifically, specification may be defined such that the distance and direction from the virtual grid points 11, 12 has been changed by type of industry using the dot pattern (by manufacturer, by service industrial field or by company using this dot pattern).

In this way, the dot pattern of the present invention can be utilized discriminately by limited usage, making it possible to ensure the security against leakage such as information leakage or code system leakage between types of industries or between companies. In other words, the limited defined information can be provided so as to readable only by the optical reader means corresponding thereto.

The present invention is not limitative to the embodiments of the invention described above. As long as a large amount of data is defined in a dot pattern by imparting different functions to dots 2, 3, 4 of a dot pattern 1, predetermined information or programs are outputted, and then, a variety of uses are enabled by recognizing directivity and speedily providing information, the present invention is not limitative to the embodiments described above. Of course, various modifications can occur without departing from the spirit of the present invention.

For example, the dots (information dots 3 or key dots 2), which are laid out around a cross point (virtual grid point 11) of grid lines 8a, 8b in the vertical and horizontal directions, may be shifted from the virtual grid point 11 onto the cross point. In addition, the dots at the cross point on an oblique grid line 8c may be laid out on the oblique grad line 8c similarly. In this way, dotes are always laid out on the grid lines 8a, 8b, 8c, whereby an algorithm of a reading program for making a search for the grid lines 8a, 8b, 8c can be simplified and reading efficiency can be remarkably improved.

INDUSTRIAL APPLICABILITY

As has been described above, according to the information input/output method using dot patterns, of the present invention, a dot pattern is picked up as image data by means of a camera, a reference grid point is first recognized and a key dot is extracted, directivity is recognized by means of the key dot, so that the direction can be used as a parameter. Next, by extracting the information dot laid out at the periphery of this key dot, information and programs can be outputted speedily.

In addition, a reference grid point dot is laid out in a dot pattern, so that, when this dot pattern is picked up as image data by means of the camera, a distortion can be corrected to a dot pattern picked up as an image due to a lens distortion of the camera or a distortion exerted at the time of oblique image pick, paper face expansion or contraction, medium surface curling, or printing.

Further, an error relative to a dot layout state can be checked, and security can be further enhanced.

The invention claimed is:
1. A system comprising:
an optical reader;
a printed matter with a dot pattern readable by the optical reader, the dot pattern comprising:
a plurality of first reference grid point dots which are arranged in one direction;
a plurality of second reference grid point dots which are arranged in other direction from one first reference grid point dot among the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the optical reader analyzes the dot pattern and numerically values the dot pattern, and
wherein the arrangement of the dot pattern on the printed matter permits the dot pattern to convey information when read by the optical reader.
2. The system according to claim 1, wherein at least one of the first and second grid point dots is shifted to be used as a key dot.

3. The system according to claim 1, wherein the dot pattern further comprises:
a key dot which is arranged at a position shifted from a position of at least one of the first and second reference grid point dots.

4. The system according to claim 1, wherein the dot pattern further comprises:
a key dot which is arranged at a position shifted from a position of at least one of the intersection points of the virtually set lines.

5. A system comprising:
an optical reader;
a printed matter with a dot pattern readable by the optical reader, the dot pattern comprising:
a plurality of first reference grid point dots which are arranged in one direction;
a plurality of second reference grid point dots which are arranged in other direction from the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the optical reader analyzes the dot pattern and numerically values the dot pattern, and
wherein the arrangement of the dot pattern on the printed matter permits the dot pattern to convey information when read by the optical reader.

6. A system comprising:
an optical reader;
a printed matter with a dot pattern readable by the optical reader, the dot pattern comprising:
a plurality of reference grid point dots which are linearly arranged in each of one direction and other direction; and
one or more information dots,
wherein a plurality of virtual points are arranged in a grid form based on the reference grid point dots, and the information dots are arranged based on one or more of the virtual points, respectively,
wherein the optical reader analyzes the dot pattern and numerically values the dot pattern, and
wherein the arrangement of the dot pattern on the printed matter permits the dot pattern to convey information when read by the optical reader.

7. An optical reader comprising:
a reading unit that obtains a dot pattern on a printed matter as image data; and
a processor that analyzes the image data and decodes a numeric value defined by the dot pattern, the dot pattern comprising:
a plurality of first reference grid point dots which are arranged in one direction;
a plurality of second reference grid point dots which are arranged in other direction from one first reference grid point dot among the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the arrangement of the dot pattern on the printed matter permits the dot pattern to convey information when read by the optical reader.

8. A reading method comprising:
by an optical reader, obtaining the dot pattern printed on a printed matter as image data; and
analyzing the image data and decoding a numeric value defined by the dot pattern, the dot pattern comprising:
a plurality of first reference grid point dots which are arranged in one direction;
a plurality of second reference grid point dots which are arranged in other direction from one first reference grid point dot among the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the arrangement of the dot pattern on the printed matter permits the dot pattern to convey information when read by the optical reader.

9. An electronic device storing a sequence of instructions for causing an optical reader to execute:
from a reading unit, obtaining a dot pattern on a printed matter onto the processor as image data; and
analyzing the image data and decoding a numeric value defined by the dot pattern, the dot pattern comprising:
a plurality of first reference grid point dots which are arranged in one direction;
a plurality of second reference grid point dots which are arranged in other direction from one first reference grid point dot among the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the arrangement of the dot pattern on the printed matter permits the dot pattern to convey information when read by the optical reader.

10. A non-transitory computer-readable medium storing a dot pattern generation program for generating a dot pattern readable by an optical reader and printing the dot pattern on a printed matter, the dot pattern comprising:
a plurality of first reference grid point dots which are arranged in one direction;

a plurality of second reference grid point dots which are arranged in other direction from one first reference grid point dot among the first reference grid point dots; and one or more information dots, wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point, wherein the optical reader analyzes the dot pattern and numerically values the dot pattern, and wherein the arrangement of the dot pattern on the printed matter permits the dot pattern to convey information when read by the optical reader.

11. A dot pattern generation device comprising:

a processor programmed in accordance with a dot pattern generation algorithm for generating a dot pattern readable by an optical reader; and a dot pattern output unit printing the dot pattern on the printed matter, the dot pattern comprising:

a plurality of first reference grid point dots which are arranged in one direction;

a plurality of second reference grid point dots which are arranged in other direction from one first reference grid point dot among the first reference grid point dots; and one or more information dots, wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point, wherein the optical reader analyzes the dot pattern and numerically values the dot pattern, and wherein the arrangement of the dot pattern on the printed matter permits the dot pattern to convey information when read by the optical reader.

12. A dot pattern generation method of a dot pattern comprising:

generating the dot pattern readable by an optical reader in accordance with a dot pattern generation algorithm for generating the dot pattern; and transmitting the dot pattern to a dot pattern output unit in order to print the dot pattern on the printed matter, the dot pattern comprising:

a plurality of first reference grid point dots which are arranged in one direction;

a plurality of second reference grid point dots which are arranged in other direction from one first reference grid point dot among the first reference grid point dots; and one or more information dots, wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point, wherein the optical reader analyzes the dot pattern and numerically values the dot pattern, and wherein the arrangement of the dot pattern on the printed matter permits the dot pattern to convey information when read by the optical reader.

13. An optical reader comprising:

a reading unit that obtains a dot pattern on a printed matter as image dat; and a processor that analyzes the image data and decodes a numeric value defined by the dot pattern, the dot pattern comprising:

a plurality of first reference grid point dots which are arranged in one direction;

a plurality of second reference grid point dots which are arranged in other direction from the first reference grid point dots; and one or more information dots, wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point, wherein the arrangement of the dot pattern on the printed matter permits the dot pattern to convey information when read by the optical reader.

14. An optical reader comprising:

a reading unit that obtains a dot pattern on a printed matter as image dat; and a processor that analyzes the image data and decodes a numeric value defined by the dot pattern, the dot pattern comprising:

a plurality of reference grid point dots which are linearly arranged in each of one direction and other direction; and one or more information dots, wherein a plurality of virtual points are arranged in a grid form based on the reference grid point dots, and the information dots are arranged based on one or more of the virtual points, respectively, wherein the arrangement of the dot pattern on the printed matter permits the dot pattern to convey information when read by the optical reader.

15. The optical reader according to any one of claims 7, 13 and 14, wherein the processor further controls an information output device based on the decoded numeric value.

16. The optical reader according to any one of claims 7, 13 and 14, wherein the processor further executes a processing corresponding to the decoded numeric value.

17. The optical reader according to claim 16, wherein the corresponding processing is outputting of at least one of a voice, an image, a moving image, a character, and an executed result of a program.

18. The optical reader according to any one of claims 7, 13 and 14, further comprising:

an output unit that outputs at least one of a voice, an image, a moving image, a character, and an executed result of a program that are related with the numeric value decoded by the processor.

19. A reading method comprising:
by an optical reader, obtaining the dot pattern printed on a printed matter as image data; and
analyzing the image data and decoding a numeric value defined by the dot pattern, the dot pattern comprising:
a plurality of first reference grid point dots which are arranged in one direction;
a plurality of second reference grid point dots which are arranged in other direction from the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the arrangement of the dot pattern on the printed matter permits the dot pattern to convey information when read by the optical reader.

20. A reading method comprising:
by an optical reader, obtaining the dot pattern printed on a printed matter as image data; and
analyzing the image data and decoding a numeric value defined by the dot pattern, the dot pattern comprising:
a plurality of reference grid point dots which are linearly arranged in each of one direction and other direction; and
one or more information dots,
wherein a plurality of virtual points are arranged in a grid form based on the reference grid point dots, and the information dots are arranged based on one or more of the virtual points, respectively,
wherein the arrangement of the dot pattern on the printed matter permits the dot pattern to convey information when read by the optical reader.

21. The reading method according to any one of claims 8, 19 and 20, further comprising:
controlling an information output device based on the decoded numeric value.

22. The reading method according to any claims 8, 19 and 20, further comprising:
outputting at least one of a voice, an image, a moving image, a character, and an executed result of a program that are related with a numeric value decoded by the processor.

23. An electronic device storing a sequence of instructions for causing an optical reader to execute:
from a reading unit, obtaining a dot pattern on a printed matter onto the processor as image data; and
analyzing the image data and decoding a numeric value defined by the dot pattern, the dot pattern comprising:
a plurality of first reference grid point dots which are arranged in one direction;
a plurality of second reference grid point dots which are arranged in other direction from the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the arrangement of the dot pattern on the printed matter permits the dot pattern to convey information when read by the optical reader.

24. An electronic device storing a sequence of instructions for causing an optical from a reading unit, obtaining a dot pattern on a printed matter onto the processor as image data; and
analyzing the image data and decoding a numeric value defined by the dot pattern, the dot pattern comprising:
a plurality of reference grid point dots which are linearly arranged in each of one direction and other direction; and
one or more information dots,
wherein a plurality of virtual points are arranged in a grid form based on the reference grid point dots, and the information dots are arranged based on one or more of the virtual points, respectively,
wherein the arrangement of the dot pattern on the printed matter permits the dot pattern to convey information when read by the optical reader.

25. The electronic device, storing a sequence of instructions for causing an optical reader to execute according to any one of claims 9, 23 and 24, further comprising:
outputting at least one of a voice, an image, a moving image, a character, and an executed result of a program that are related with a numeric value decoded by the processor.

26. A non-transitory-computer readable medium storing a dot pattern generation program for generating a dot pattern readable by an optical reader and printing the dot pattern on a printed matter, the dot pattern comprising:
a plurality of first reference grid point dots which are arranged in one direction;
a plurality of second reference grid point dots which are arranged in other direction from the first reference grid point dots; and
one or more information dots,
wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point,
wherein the optical reader analyzes the dot pattern and numerically values the dot pattern, and
wherein the arrangement of the dot pattern on the printed matter permits the dot pattern to convey information when read by the optical reader.

27. A non-transitory-computer readable medium storing a dot pattern generation program for generating a dot pattern readable by an optical reader and printing the dot pattern on a printed matter, the dot pattern comprising:
a plurality of reference grid point dots which are linearly arranged in each of one direction and other direction; and
one or more information dots,
wherein a plurality of virtual points are arranged in a grid form based on the reference grid point dots, and the information dots are arranged based on one or more of the virtual points, respectively, wherein the optical reader analyzes the dot pattern and numerically values the dot pattern, and wherein the arrangement of the dot pattern on the printed matter permits the dot pattern to convey information when read by the optical reader.

28. A dot pattern generation device comprising:

a processor programmed in accordance with a dot pattern generation algorithm for generating a dot pattern readable by an optical reader; and a dot pattern output unit printing the dot pattern on the printed matter, the dot pattern comprising:

a plurality of first reference grid point dots which are arranged in one direction;

a plurality of second reference grid point dots which are arranged in other direction from the first reference grid point dots; and one or more information dots, wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point, wherein the optical reader analyzes the dot pattern and numerically values the dot pattern, and wherein the arrangement of the dot pattern on the printed matter permits the dot pattern to convey information when read by the optical reader.

29. A dot pattern generation device comprising:

a processor programmed in accordance with a dot pattern generation algorithm for generating a dot pattern readable by an optical reader; and a dot pattern output unit printing the dot pattern on the printed matter, the dot pattern comprising:

a plurality of reference grid point dots which are linearly arranged in each of one direction and other direction; and one or more information dots, wherein a plurality of virtual points are arranged in a grid form based on the reference grid point dots, and the information dots are arranged based on one or more of the virtual points, respectively, wherein the optical reader analyzes the dot pattern and numerically values the dot pattern, and wherein the arrangement of the dot pattern on the printed matter permits the dot pattern to convey information when read by the optical reader.

30. A dot pattern generation method of a dot pattern comprising:

generating the dot pattern readable by an optical reader in accordance with a dot pattern generation algorithm for generating the dot pattern; and transmitting the dot pattern to a dot pattern output unit in order to print the dot pattern on the printed matter, the dot pattern comprising:

a plurality of first reference grid point dots which are arranged in one direction;

a plurality of second reference grid point dots which are arranged in other direction from the first reference grid point dots; and one or more information dots, wherein one or more start points are defined at one or more of intersection points of lines which are virtually set beginning from the first reference grid point dots in the other direction and lines which are virtually set beginning from the second reference grid point dots in the one direction, and the information dots are arranged with reference to the start points, respectively, and each of the information dots have a distance and a direction from the corresponding start point, wherein the optical reader analyzes the dot pattern and numerically values the dot pattern, and wherein the arrangement of the dot pattern on the printed matter permits the dot pattern to convey information when read by the optical reader.

31. A dot pattern generation method of a dot pattern comprising:

generating the dot pattern readable by an optical reader in accordance with a dot pattern generation algorithm for generating the dot pattern; and transmitting the dot pattern to a dot pattern output unit in order to print the dot pattern on the printed matter, the dot pattern comprising:

a plurality of reference grid point dots which are linearly arranged in each of one direction and other direction; and one or more information dots, wherein a plurality of virtual points are arranged in a grid form based on the reference grid point dots, and the information dots are arranged based on one or more of the virtual points, respectively, wherein the optical reader analyzes the dot pattern and numerically values the dot pattern, and wherein the arrangement of the dot pattern on the printed matter permits the dot pattern to convey information when read by the optical reader.

\* \* \* \* \*